(12) United States Patent
Uemura et al.

(10) Patent No.: US 9,046,691 B2
(45) Date of Patent: Jun. 2, 2015

(54) LASER SCANNING OPTICAL DEVICE

(71) Applicants: Hideo Uemura, Toyokawa (JP); Makoto Ooki, Toyohashi (JP); Wataru Senoo, Toyokawa (JP)

(72) Inventors: Hideo Uemura, Toyokawa (JP); Makoto Ooki, Toyohashi (JP); Wataru Senoo, Toyokawa (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 246 days.

(21) Appl. No.: 13/573,670

(22) Filed: Oct. 3, 2012

(65) Prior Publication Data

US 2013/0083380 A1 Apr. 4, 2013

(30) Foreign Application Priority Data

Oct. 3, 2011 (JP) .................................. 2011-218823

(51) Int. Cl.
*G02B 26/08* (2006.01)
*G02B 26/12* (2006.01)
*H04N 1/00* (2006.01)
(Continued)

(52) U.S. Cl.
CPC .................. *G02B 26/12* (2013.01); *H04N 1/00* (2013.01); *G02B 5/3083* (2013.01); *G02B 26/125* (2013.01); *G03G 15/0435* (2013.01)

(58) Field of Classification Search
CPC . G02B 13/0005; G02B 26/123; G02B 26/125
USPC ...................... 359/201.2, 204.1, 205.1, 206.1, 359/216.1–218.1, 201.1, 207.5
See application file for complete search history.

(56) References Cited

U.S. PATENT DOCUMENTS

| 6,141,118 A | 10/2000 | Yamawaki et al. |
| 2003/0128412 A1 | 7/2003 | Iizuka et al. |

(Continued)

FOREIGN PATENT DOCUMENTS

| CN | 1673801 A | 9/2005 |
| CN | 1932577 A | 3/2007 |

(Continued)

OTHER PUBLICATIONS

Japanese Office Action (Decision to Grant Patent) dated Oct. 29, 2013, issued by the Japanese Patent Office in corresponding Japanese Patent Application No. 2011-218823, and English language translation of Office Action. (6 pages).

(Continued)

*Primary Examiner* — Euncha Cherry
(74) *Attorney, Agent, or Firm* — Buchanan Ingersoll & Rooney PC

(57) ABSTRACT

In an oblique-incidence optical system, a pair of optical beams are incident from the deflection section on an optically anisotropic common scanning lens. First and second individual scanning lenses are optically anisotropic and on which the one and the other of the pair of optical beams are respectively incident from the common scanning lens. Light sources are arranged such that their respective planes of polarization are symmetrical to each other. The first and second individual scanning lenses are arranged so as to be symmetrical to each other, the common scanning lens has a symmetrical shape in the secondary direction with respect to a plane including its own optical axis, and each of the individual scanning lenses has an asymmetrical shape in the secondary direction with respect to a plane including its own optical axis.

6 Claims, 10 Drawing Sheets

(51) Int. Cl.
*G02B 5/30* (2006.01)
*G03G 15/043* (2006.01)

(56) References Cited

U.S. PATENT DOCUMENTS

| | | |
|---|---|---|
| 2003/0193703 A1 | 10/2003 | Takakubo |
| 2004/0218029 A1 | 11/2004 | Shiraishi |
| 2005/0168563 A1 | 8/2005 | Shiraishi |
| 2006/0126147 A1 | 6/2006 | Takakubo |
| 2007/0030538 A1 | 2/2007 | Hirakawa et al. |
| 2007/0058231 A1 | 3/2007 | Kim et al. |
| 2007/0206261 A1* | 9/2007 | Hayashi et al. ............... 359/218 |
| 2008/0165244 A1 | 7/2008 | Tomioka et al. |
| 2011/0122217 A1 | 5/2011 | Arai et al. |

FOREIGN PATENT DOCUMENTS

| | | |
|---|---|---|
| CN | 101226277 A | 7/2008 |
| EP | 0 813 090 A2 | 12/1997 |
| EP | 1 749 668 A1 | 2/2007 |
| JP | 6-148547 A | 5/1994 |
| JP | 2001-188188 A | 7/2001 |
| JP | 2002-311360 A | 10/2002 |
| JP | 2003-005114 A | 1/2003 |
| JP | 2004-294886 A | 10/2004 |
| JP | 2004-334174 A | 11/2004 |
| JP | 2005-157325 A | 6/2005 |
| JP | 2005-173354 A | 6/2005 |
| JP | 2006-215483 A | 8/2006 |
| JP | 2007-079512 A | 3/2007 |
| JP | 2007-133320 A | 5/2007 |
| JP | 2008-76562 A | 4/2008 |
| JP | 2011-59242 A | 3/2011 |
| JP | 2011-112734 A | 6/2011 |

OTHER PUBLICATIONS

Office Action (Notification of First Office Action) issued on Jul. 14, 2014, by the State Intellectual Property Office of P.R. China in corresponding Chinese Patent Application No. 201210370741.X, and an English Translation of the Office Action. (27 pages).

* cited by examiner

LASER SCANNING OPTICAL DEVICE

CROSS REFERENCE TO RELATED APPLICATION

This application claims priority to Japanese Patent Application No. 2011-218823 filed on Oct. 3, 2011, the contents of which are incorporated herein by reference.

BACKGROUND OF THE INVENTION

1. Field of the Invention

The present invention relates to a laser scanning optical device that includes optically anisotropic scanning lenses.

2. Description of Related Art

The mainstream type among image forming apparatuses such as full-color copiers and printers is a tandem system in which four photoreceptors are arranged so as to correspond to the colors Y (yellow), M (magenta), C (cyan), and K (black), and images of the respective colors formed on the photosensitive drums are transferred and synthesized on an intermediate transfer belt. Moreover, such a tandem image forming apparatus is equipped with a laser scanning optical device that uses a deflection means (e.g., polygon mirror) to simultaneously scan four optical beams on their respective photosensitive drums, thereby drawing an image.

Conventionally, there are various approaches proposed to inhibit shading (i.e., uneven light intensities) in laser scanning optical devices. In the approach disclosed in Japanese Patent Laid-Open Publication No. 2001-188188, beams from sources with different shading characteristics are synthesized by a polarizer. As a result, an average light intensity distribution is smoothened, achieving high image quality. Moreover, to correct uneven light intensities, Japanese Patent Laid-Open Publication No. 2005-157325 discloses a light intensity distribution control element with lugs of varying height in a principal scanning direction. By using such a light intensity distribution control element, the difference in uneven light intensities between colors can be decreased.

Incidentally, some laser scanning optical devices are equipped with optically anisotropic (i.e., birefringent) scanning lenses. When such a scanning lens passes an optical beam therethrough, the polarization state of the passed optical beam is changed by birefringence, so that reflectance and transmittance varies along the principal scanning direction of the scanning lens, resulting in an uneven light intensity on a photoreceptor. Particularly in the case of the tandem system, in addition to such an uneven light intensity along the principal scanning direction, there are also differences in uneven light intensities between optical paths for their respective colors, as shown in FIG. 10, causing a problem with reduced quality of an image obtained by synthesizing images of the respective colors.

SUMMARY OF THE INVENTION

A laser scanning optical device according to an embodiment of the present invention that scans optical beams in a principal scanning direction on scan surfaces of photoreceptors provided for their respective colors, includes: a plurality of light sources that emit optical beams from a plurality of emission points; a deflection section that, upon incidence of optical beams from the light sources, deflects the incident optical beams by a polygon mirror; and a scanning optical system that causes the optical beams deflected by the deflection section to form images on the scan surfaces for the respective colors, in which, among the optical beams emitted by the light sources, a predetermined pair of optical beams are incident on the polygon mirror at the same inclination angle, symmetrically with respect to a horizontal plane perpendicular to a central axis of the polygon mirror and passing through a center of the polygon mirror in a secondary direction, the scanning optical system includes: a common scanning lens that is optically anisotropic and on which a pair of optical beams polarized by the polygon mirror are incident; and first and second individual scanning lenses that are optically anisotropic and on which the one and the other of the pair of optical beams are respectively incident after the pair is transmitted through the common scanning lens, the light sources that emit the pair of optical beams are arranged such that their respective planes of polarization are symmetrical to each other with respect to the horizontal plane, the planes of polarization being planes each including the emission points and having angles other than 0° and 90° with respect to the horizontal plane, the first and second individual scanning lenses are arranged so as to be symmetrical to each other with respect to the horizontal plane, the common scanning lens has a symmetrical shape in the secondary direction with respect to a plane including its own optical axis and being parallel to the horizontal plane, and each of the individual scanning lenses has an asymmetrical shape in the secondary direction with respect to a plane including its own optical axis and being parallel to the horizontal plane.

DETAILED DESCRIPTION OF THE PREFERRED EMBODIMENTS

Embodiment

Hereinafter, a laser scanning optical device according to an embodiment of the present invention will be described with reference to the drawings.

Configuration of Laser Scanning Optical Device

Figure 1:
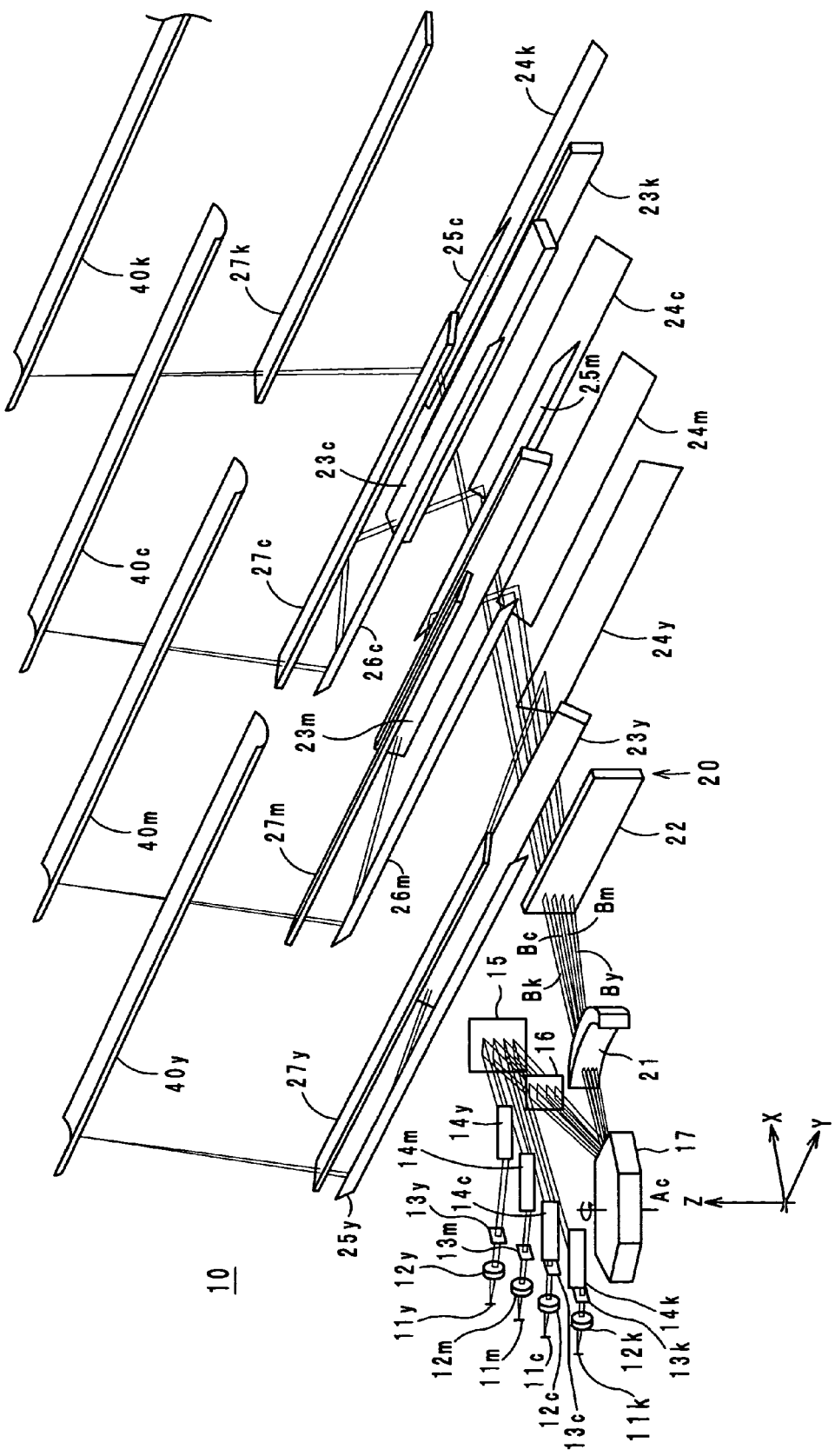
FIG. 1 is an external perspective view of a laser scanning optical device according to an embodiment.

First, the X, Y, and Z-axes shown in FIG. 1 will be described. The Y-axis represents the direction of optical beam B being scanned on the surface of each photoreceptor drum 40 (referred to below as the principal scanning direction). The Z-axis represents the secondary direction. The X-axis represents the direction perpendicular to both the Y and Z-axes.

The laser scanning optical device 10 is suitable for a full-color copier or printer or a multifunction peripheral incorporating their functions. In general, optical beams B ($B_y$, $B_m$, $B_c$, and $B_k$) are scanned on photoreceptor drums 40 ($40_y$, $40_m$, $40_c$, and $40_k$) provided for their respective colors Y, M, C, and K. Here, affixes y, m, c, and k added to the right of reference characters denote yellow, magenta, cyan, and black. For example, photoreceptor drum $40_y$ denotes the photoreceptor drum 40 for yellow.

The laser scanning optical device 10 includes light sources 11 ($11_y$, $11_m$, $11_c$, and $11_k$), collimator lenses 12 ($12_y$, $12_m$, $12_c$, and $12_k$), diaphragms 13 ($13_y$, $13_m$, $13_c$, and $13_k$), synthesizing mirrors 14 ($14_y$, $14_m$, $14_c$, and $14_k$), a mirror 15, a cylindrical lens 16, a deflector 17, a scanning lens group 20, mirrors 24 ($24_y$, $24_m$, $24_c$, and $24_k$), 25 ($25_y$, $25_m$, and $25_c$), and 26 ($26_m$ and $26_c$) and dust-tight windows 27 ($27_y$, $27_m$, $27_c$, and $27_k$). Here, at least the scanning lens group 20 and the mirrors 24 constitute a scanning optical system.

Light sources $11_y$, $11_m$, $11_c$, and $11_k$ are arranged in the same order recited above from top to bottom, and emit optical beams $B_y$, $B_m$, $B_c$, and $B_k$.

The light source 11 will be described in detail below with reference to FIGS. 2 and 3. First, in FIG. 2, the X'-axis represents the direction of the optical axis A0 of the light source 11. In addition, the Y' and Z'-axes represent the horizontal and vertical directions of the emission surface of the light source 11 as viewed from the front.

Figure 2A:
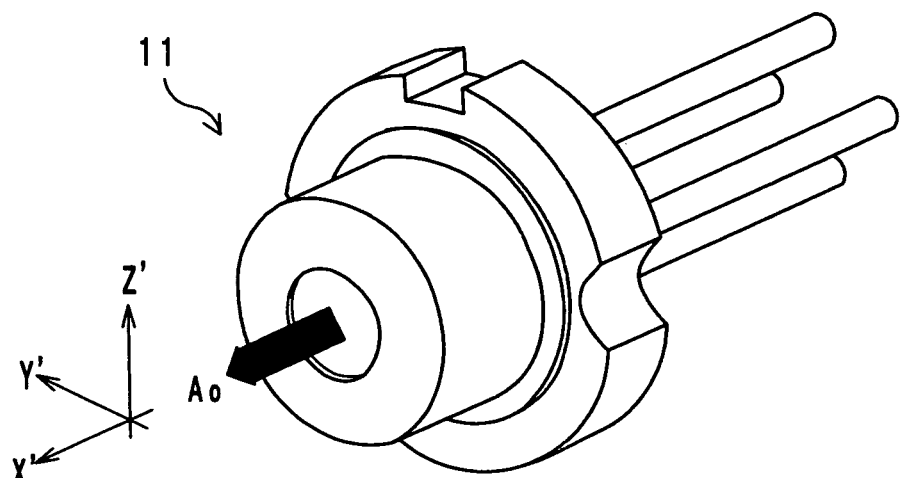
FIG. 2A is a perspective view illustrating a light source in FIG. 1.
Figure 2B:
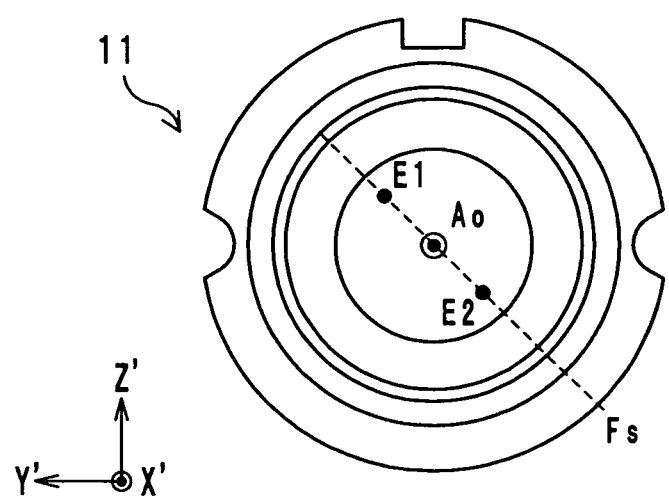
FIG. 2B is a front view of an emission surface of the light source in FIG. 1.

The light source 11 is a multi-beam laser diode, for example, as shown in FIGS. 2A and 2B. In addition, the light source 11 has at least two emission points $E_1$ and $E_2$ on its emission surface (Y'Z' plane), and emits optical beams B from emission points $E_1$ and $E_2$ such that the beams are parallel to the optical axis A0 (X'-axis). Herein, a plane including a segment extending between two emission points $E_1$ and $E_2$ and the optical axis A0 will be referred to as a plane of polarization Fs.

Figure 3A:
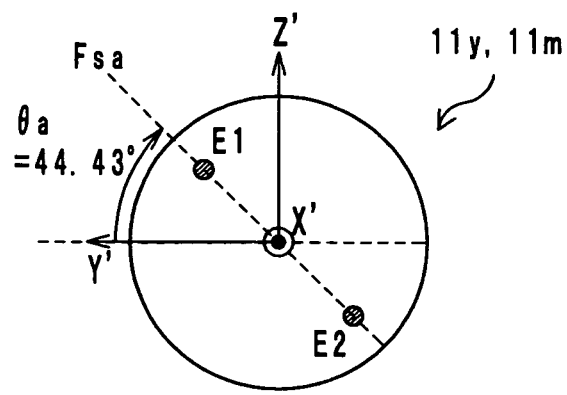
FIG. 3A is a schematic diagram illustrating the relationship between the plane of polarization and the horizontal plane for Y and M light sources.
Figure 3B:
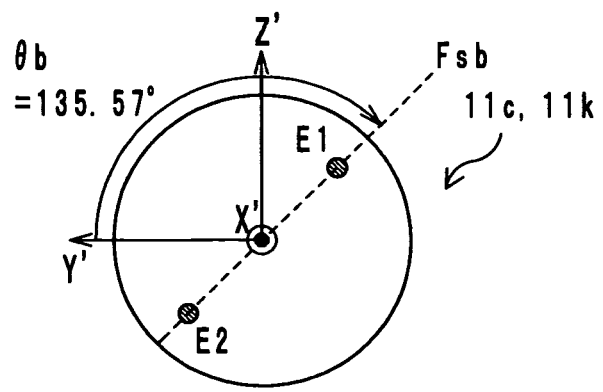
FIG. 3B is a schematic diagram illustrating the relationship between the plane of polarization and the horizontal plane for C and K light sources.

Light sources $11_y$ and $11_m$ are positioned such that their planes of polarization $Fs_a$ cross the X'Y' plane at a predetermined angle of $\theta_a$ ($\theta_a=44.43°$) when the emission surfaces are viewed from the front, as shown in FIG. 3A. Moreover, light sources $11_c$ and $11_k$ are positioned such that their planes of polarization $Fs_b$ cross the X'Y' plane at a predetermined angle of $\theta_b$ ($\theta_b=135.57°$) when the emission surfaces are viewed from the front, as shown in FIG. 3B. Here, the plane of polarization $Fs_a$ of light source $11_y$ and the plane of polarization $Fs_b$ of light source $11_k$ are symmetrical to each other with respect to horizontal plane $F_1$ to be described later (see FIG. 4). Moreover, the plane of polarization $Fs_a$ of light source $11_m$ and the plane of polarization $Fs_b$ of light source $11_c$ are symmetrical to each other with respect to horizontal plane $F_1$. Both $\theta_a$ and $\theta_b$ are selected to take values other than 0° and 90°.

FIG. 1 is referenced again. Collimator lenses $12_y$, $12_m$, $12_c$, and $12_k$ are provided so as to correspond to light sources $11_y$, $11_m$, $11_c$, and $11_k$, in order to convert optical beams $B_y$, $B_m$, $B_c$, and $B_k$ into parallel beams. Diaphragms $13_y$, $13_m$, $13_c$, and $13_k$ shape parallel optical beams $B_y$, $B_m$, $B_c$, and $B_k$, respectively, to predetermined widths in the Z-axis direction (i.e., secondary direction).

Synthesizing mirrors $14_y$, $14_m$, and $14_c$ function as synthesizing means for reflecting optical beams $B_y$, $B_m$, and $B_c$, respectively, such that optical beams $B_y$, $B_m$, and $B_c$ travel in the same direction as the traveling direction of optical beam $B_k$ reflected by synthesizing mirror $14_k$. The mirror 15 reflects optical beams $B_y$, $B_m$, $B_c$, and $B_k$ caused to travel in the same direction by the synthesizing mirrors 14.

The cylindrical lens 16 concentrates optical beams $B_y$, $B_m$, $B_c$, and $B_k$ in the Z-axis direction (i.e., secondary direction). More specifically, the cylindrical lens 16 concentrates optical beams $B_y$, $B_m$, $B_c$, and $B_k$ in the Z-axis direction such that optical beams $B_y$, $B_m$, $B_c$, and $B_k$ are linearly focused near the reflective surface on the polygon mirror of the deflector 17.

The deflector 17 is configured by the polygon mirror and a motor (not shown), so as to deflect optical beams $B_y$, $B_m$, $B_c$, and $B_k$ in the Y-axis direction (i.e., principal scanning direction).

Figure 4:
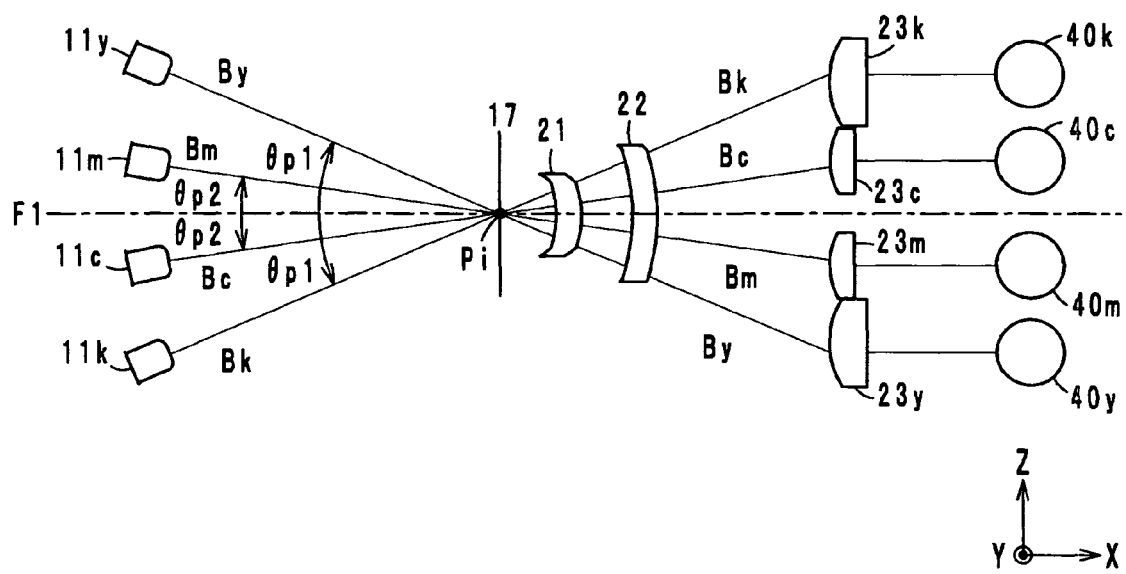
FIG. 4 is a schematic diagram in which principal parts of the laser scanning optical device in FIG. 1 are separated out in the X-axis direction.

FIG. 4 is referenced now. In FIG. 4, the center of the polygon mirror in the Z-axis direction (referred to below as the secondary direction center) is denoted by Pi. Moreover, a horizontal plane perpendicular to the central axis Ac (see FIG. 1) of the polygon mirror and including the secondary direction center Pi is denoted by $F_1$. Optical beams $B_y$ and $B_k$ are incident on the deflector 17 at inclination angle $\theta p_1$ so as to be symmetrical to each other with respect to horizontal plane $F_1$ (i.e., oblique-incidence optical system). Optical beams $B_m$ and $B_c$ are incident on the deflector 17 at inclination angle $\theta p_2$ ($0<\theta p_2<\theta p_1$) so as to be symmetrical to each other with respect to horizontal plane $F_1$. Hereinbelow, optical beams $B_y$ and $B_k$ having inclination angle $\theta p_1$ in common will be referred to as a first pair, and optical beams $B_m$ and $B_c$ having inclination angle $\theta p_2$ in common will be referred to as a second pair. Note that in the present embodiment, $\theta p_1$ is 2.19°, for example, and $\theta p_2$ is 0.73°, for example.

FIG. 1 is referenced again. The scanning lens group 20 focuses optical beams $B_y$, $B_m$, $B_c$, and $B_k$ deflected by the deflector 17 on the circumferences (i.e., scan surfaces) of photoreceptor drums $40_y$, $40_m$, $40_c$, and $40_k$. More specifically, the scanning lens group 20 has optical characteristics causing optical beams $B_y$, $B_m$, $B_c$, and $B_k$ to scan photoreceptor drums $40_y$, $40_m$, $40_c$, and $40_k$ at a constant speed and making optical beams $B_y$, $B_m$, $B_c$, and $B_k$ equal in diameter. Moreover, the scanning lens group 20 includes common scanning lenses 21 and 22 commonly used for all the colors and individual scanning lenses 23 ($23_y$, $23_m$, $23_c$, and $23_k$) provided for their respective colors. The scanning lenses 21, 22, and 23 are provided in the same order recited above so as to be directed from the upstream (i.e., the light source 11 side) in the traveling direction of the optical beams B toward the downstream (i.e., the photoreceptor drum 40 side).

The mirrors 24 ($24_y$, $24_m$, $24_c$, and $24_k$), 25 ($25_y$, $25_m$, and $25_c$), and 26 ($26_m$ and $26_c$) reflect and guide optical beams $B_y$, $B_m$, $B_c$, and $B_k$, which passed through the common scanning lens 22, to photoreceptor drums $40_y$, $40_m$, $40_c$, and $40_k$.

More specifically, optical beam $B_y$ is reflected by mirror $24_y$, passing through first individual scanning lens $23_y$, and then further reflected by mirror $25_y$, passing through dust-tight window $27_y$, and forming an image on photoreceptor drum $40_y$. Optical beam $B_m$ is reflected by mirrors $24_m$ and $25_m$, passing through third individual scanning lens $23_m$, and then further reflected by mirror $26_m$, passing through dust-tight window $27_m$ and forming an image on photoreceptor drum $40_m$. Optical beam $B_c$ is reflected by mirror $24_c$, passing through fourth individual scanning lens $23_c$, and then further reflected by mirrors $25_c$ and $26_c$, passing through dust-tight window $27_c$ and forming an image on photoreceptor drum $40_c$. Optical beam $B_k$ passes through second individual scanning lens $23_k$, and is then reflected by mirror $24_k$, passing through dust-tight window $27_k$ and forming an image on photoreceptor drum $40_k$.

Here, the common scanning lenses 21 and 22 and the individual scanning lenses 23 will be described in detail. All of the lenses 21 to 23 are lenses formed of, for example, optically anisotropic (birefringent) resin such as polycarbonate. More concretely, the lenses 21 to 23 have photoelastic coefficients of $40 \times 10^{-12} \, PA^{-1}$ or more. Moreover, each of the common scanning lenses 21 and 22 has a symmetrical shape in the Z-axis direction (i.e., secondary direction) with respect to a plane that includes the optical axis of the lens and is parallel to horizontal plane $F_1$ mentioned earlier.

By way of example, the common scanning lenses 21 and 22 have specifications shown in Table 1 below. Note that surface numbers 1 and 2 denote surfaces of the common scanning lens 21 at which optical beams B enter and exit, and surface numbers 3 and 4 denote entrance and exit surfaces on the common scanning lens 22.

TABLE 1

| | CONFIGURATION OF COMMON SCANNING LENS | | | | | |
|---|---|---|---|---|---|---|
| | SURFACE NUMBER | SHAPE OF SURFACE | CORDINATE OF VERTEX | | | REFRACTIVE INDEX |
| | | | X | Y | Z | |
| fθ1 | 1 | FREE-FORM SURFACE | 35.000 | 0.000 | 0.000 | 1.572 |
| | 2 | FREE-FORM SURFACE | 41.000 | 0.000 | 0.000 | 1.000 |
| fθ2 | 3 | FREE-FORM SURFACE | 90.500 | 0.000 | 0.000 | 1.572 |
| | 4 | FREE-FORM SURFACE | 95.000 | 0.000 | 0.000 | |

Free-form surface coefficients for surface numbers 1 to 4 in Table 1 are shown in Table 2 below.

TABLE 2

| FREE-FORM SURFACE COEFFICIENT OF COMMON SCANNING LENS | | | |
|---|---|---|---|
| SURFACE NUMBER 1 | FREE-FORM SURFACE | Z | 0 |
| | Y | 0 | 0.0000E+00 |
| | | 1 | 6.4631E−04 |
| | | 2 | −1.0244E−02 |
| | | 3 | −8.0207E−07 |
| | | 4 | −1.2984E−06 |
| | | 5 | −1.0965E−09 |
| | | 6 | −2.3867E−10 |
| | | 7 | 1.7848E−12 |
| | | 8 | −2.5097E−13 |
| | | 9 | −9.9916E−16 |
| | | 10 | 6.6213E−17 |
| SURFACE NUMBER 2 | FREE-FORM SURFACE | Z | 0 |
| | Y | 0 | 0.0000E+00 |
| | | 1 | −9.5484E−04 |
| | | 2 | −1.2265E−02 |
| | | 3 | −1.0680E−06 |
| | | 4 | −1.6155E−06 |
| | | 5 | −1.2035E−09 |
| | | 6 | −4.5681E−10 |
| | | 7 | 8.2256E−13 |
| | | 8 | −2.2446E−13 |
| | | 9 | −4.5764E−16 |
| | | 10 | 2.3052E−19 |
| SURFACE NUMBER 3 | FREE-FORM SURFACE | Z | 0 |
| | Y | 0 | 0.0000E+00 |
| | | 1 | 0.0000E+00 |
| | | 2 | −3.4963E−05 |
| | | 3 | 0.0000E+00 |
| | | 4 | 1.9564E−08 |
| | | 5 | 0.0000E+00 |
| | | 6 | −4.8483E−12 |
| | | 7 | 0.0000E+00 |
| | | 8 | 1.4812E−15 |
| | | 9 | 0.0000E+00 |

TABLE 2-continued

FREE-FORM SURFACE COEFFICIENT OF COMMON SCANNING LENS

| | | | 10 | | −1.7380E−19 |
|---|---|---|---|---|---|
| SURFACE | FREE-FORM | | Z | | |
| NUMBER 4 | SURFACE | 0 | 1 | 2 |
| | Y 0 | 0.0000E+00 | 0.0000E+00 | −1.5721E−03 |
| | 1 | 0.0000E+00 | 0.0000E+00 | 0.0000E+00 |
| | 2 | −2.8208E−04 | 0.0000E+00 | 7.7879E−08 |
| | 3 | 0.0000E+00 | 0.0000E+00 | 0.0000E+00 |
| | 4 | −5.4489E−08 | 0.0000E+00 | −5.8358E−11 |
| | 5 | 0.0000E+00 | 0.0000E+00 | 0.0000E+00 |
| | 6 | 3.9135E−12 | 0.0000E+00 | 1.2125E−14 |
| | 7 | 0.0000E+00 | 0.0000E+00 | 0.0000E+00 |
| | 8 | −4.6584E−16 | 0.0000E+00 | 1.3404E−18 |
| | 9 | 0.0000E+00 | 0.0000E+00 | 0.0000E+00 |
| | 10 | 2.8724E−20 | 0.0000E+00 | −5.9689E−22 |

Note
that the free-form surfaces are defined by the following formula.

$$X = \sum_i \sum_j C_{ij} * Y^i * Z^j$$

Figure 5:
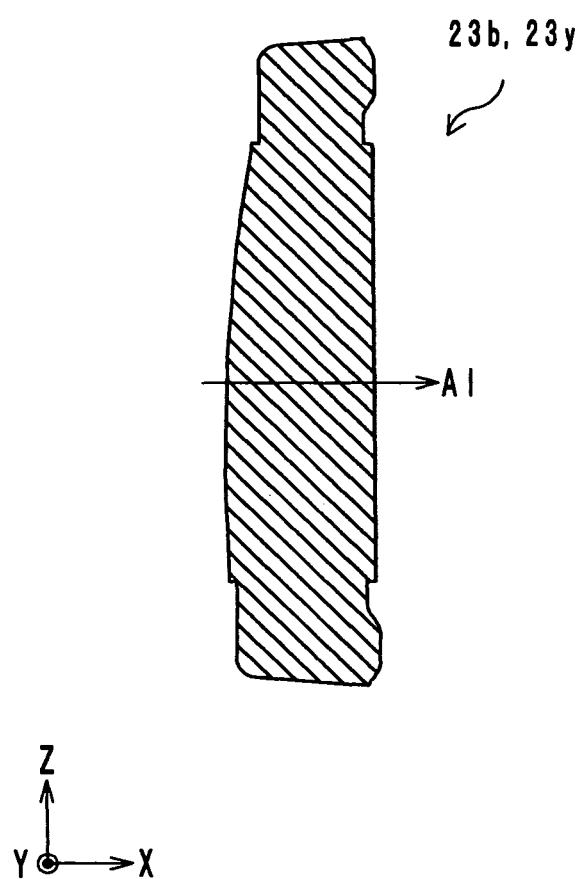
FIG. 5 is a cross-sectional view of an individual scanning lens taken along ZX plane.

Furthermore, first and second individual scanning lenses $23_y$ and $23_k$ are shaped such that each lens is asymmetrical in the Z-axis direction (secondary direction) with respect to a plane including the optical axis A1 of the lens and parallel to horizontal plane $F_1$, as illustrated in FIG. 5. In addition, both individual scanning lenses $23_y$ and $23_k$ are molded lenses produced from the same mold. Moreover, both individual scanning lenses $23_y$ and $23_k$ are lenses of the same shape arranged in opposite orientations (i.e., rotated 180 degrees from each other about the optical axis A1) and positions symmetrical to each other with respect to horizontal plane $F_1$. In general, dominant factors to determine a birefringence distribution (see FIG. 6 for an example of the distribution) are the shape of the lens and the channel of resin flow at the formation stage. Accordingly, so long as lenses have the same shape, the state of birefringent distribution does not significantly vary between the lenses even if they are produced in different lots. Therefore, when scanning lenses of the same shape, produced from the same mold, are used, in the optical paths of a pair of optical beams $B_y$ and $B_k$ equal in the absolute value of incidence angle θp, the optical beams emitted by the light sources pass relatively the same positions with respect to their individual scanning lenses ($23_y$ and $23_k$), so that for each scan angle, the distribution of differences in birefringence retardation of the scanning lenses matches the polarization states of optical beams incident on the scanning lenses. As a result, for each optical path, the polarization state can be changed in accordance with the distribution of differences in birefringence retardation, so that two optical paths equal in the oblique-incidence angle can be equalized in terms of uneven reflection/transmittance. That is, uneven light intensities on scan surfaces can be equalized, resulting in a reduced difference in uneven light intensities between optical paths.

Furthermore, third and fourth individual scanning lenses $23_m$ and $23_c$ are molded lenses produced from the same mold as well but they are different in shape from first and second individual scanning lenses $23_y$ and $23_k$. In addition, both individual scanning lenses $23_m$ and $23_c$ can achieve the same effect as described above, when they are lenses of the same shape arranged in opposite orientations (i.e., rotated 180 degrees from each other about the optical axis A1) and positions symmetrical to each other with respect to horizontal plane $F_1$.

By way of example, third and fourth individual scanning lenses $23_m$ and $23_c$ have specifications shown in the lower panel of Table 3 below. First and second individual scanning lenses $23_y$ and $23_k$ have specifications shown in the upper panel of Table 3, for example. Here, in Table 3, surface numbers 5, 6, and 7 for "within fθ3" denote the entrance surface, the exit surface, and the imaging surface for third and fourth individual scanning lenses $23_m$ and $23_c$, and surface numbers 5, 6, and 7 for "beyond fθ3" denote the entrance surface, the exit surface, and the imaging surface for first and second individual scanning lenses $23_y$ and $23_k$.

TABLE 3

| CONFIGURATION OF INDIVIDUAL SCANNING LENS | | | | | | |
|---|---|---|---|---|---|---|
| | SURFACE | SHAPE OF | CORDINATE OF VERTEX | | | REFRACTIVE |
| | NUMBER | SURFACE | X | Y | Z | INDEX |
| BEYOND fθ 3 | 5 | FREE-FORM SURFACE | 251.700 | 0.000 | −9.625 | 1.572 |
| | 6 | FLAT SURFACE | 255.700 | 0.000 | −9.625 | |
| IMAGING SURFACE | 7 | FLAT SURFACE | 380.600 | 0.000 | −8.733 | 1.000 |
| WITHIN fθ 3 | 5 | FREE-FORM SURFACE | 251.700 | 0.000 | −3.207 | 1.572 |

TABLE 3-continued

CONFIGURATION OF INDIVIDUAL SCANNING LENS

| | SURFACE NUMBER | SHAPE OF SURFACE | CORDINATE OF VERTEX | | | REFRACTIVE INDEX |
|---|---|---|---|---|---|---|
| | | | X | Y | Z | |
| | 6 | FLAT SURFACE | 255.700 | 0.000 | −3.207 | |
| IMAGING SURFACE | 7 | FLAT SURFACE | 380.600 | 0.000 | −2.818 | 1.000 |

Free-form surface coefficients for surface numbers 5 to 7 in Table 3 are shown in Table 4 below.

TABLE 4

FREE-FORM SURFACE COEFFICIENT OF INDIVIDUAL SCANNING LENS

| | FREE-FORM SURFACE | | Z | | | |
|---|---|---|---|---|---|---|
| | | | 0 | 1 | 2 | 3 |
| BEYOND SURFACE 5 | Y | 0 | 0.0000E+00 | −7.4292E−02 | 1.0142E−02 | −2.0085E−06 |
| | | 1 | 0.0000E+00 | 0.0000E+00 | 0.0000E+00 | 0.0000E+00 |
| | | 2 | −2.7438E−04 | 8.2580E−07 | −1.3268E−07 | −7.2673E−10 |
| | | 3 | 0.0000E+00 | 0.0000E+00 | 0.0000E+00 | 0.0000E+00 |
| | | 4 | 2.4897E−08 | 1.5676E−11 | 3.8896E−12 | 5.8609E−13 |
| | | 5 | 0.0000E+00 | 0.0000E+00 | 0.0000E+00 | 0.0000E+00 |
| | | 6 | −5.2487E−13 | −2.0244E−15 | −3.9286E−16 | −1.4312E−16 |
| | | 7 | 0.0000E+00 | 0.0000E+00 | 0.0000E+00 | 0.0000E+00 |
| | | 8 | 3.3540E−18 | 1.2453E−19 | 2.9580E−20 | 1.3381E−20 |
| | | 9 | 0.0000E+00 | 0.0000E+00 | 0.0000E+00 | 0.0000E+00 |
| | | 10 | 8.5578E−23 | −3.6713E−24 | −8.0071E−25 | −4.2432E−25 |
| WITHIN SURFACE 5 | Y | 0 | 0.0000E+00 | −2.5414E−02 | 1.0175E−02 | −9.7588E−07 |
| | | 1 | 0.0000E+00 | 0.0000E+00 | 0.0000E+00 | 0.0000E+00 |
| | | 2 | −2.7575E−04 | 2.9006E−07 | −1.3627E−07 | 3.0287E−10 |
| | | 3 | 0.0000E+00 | 0.0000E+00 | 0.0000E+00 | 0.0000E+00 |
| | | 4 | 2.5085E−08 | 4.8213E−12 | 5.8644E−12 | −4.6550E−14 |
| | | 5 | 0.0000E+00 | 0.0000E+00 | 0.0000E+00 | 0.0000E+00 |
| | | 6 | −5.3232E−13 | −6.7939E−16 | −8.3603E−16 | −3.3694E−18 |
| | | 7 | 0.0000E+00 | 0.0000E+00 | 0.0000E+00 | 0.0000E+00 |
| | | 8 | 3.5274E−18 | 4.3544E−20 | 6.9140E−20 | 9.3377E−22 |
| | | 9 | 0.0000E+00 | 0.0000E+00 | 0.0000E+00 | 0.0000E+00 |
| | | 10 | 7.8086E−23 | −1.3208E−24 | −2.0150E−24 | −4.0881E−26 |

Furthermore, photoreceptor drums $40_y$, $40_m$, $40_c$, and $40_k$ are rotationally driven at a constant speed. With the configuration as above, optical beams $B_y$, $B_m$, $B_c$, and $B_k$ are scanned along the Y-axis (principal scanning direction), and photoreceptor drums $40_y$, $40_m$, $40_c$, and $40_k$ are rotated about the Y-axis, so that electrostatic latent images are formed on photoreceptor drums $40_y$, $40_m$, $40_c$, and $40_k$.

Actions and Effects of Laser Scanning Optical Device

Figure 6:
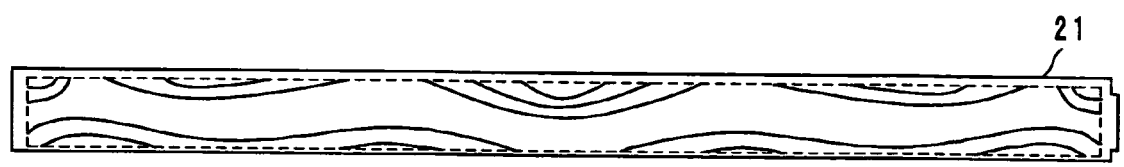
FIG. 6 is a schematic diagram showing contours that represent the amount of birefringence in a common scanning lens.
Figure 6:
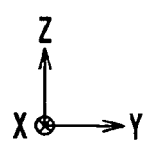
Figure 10:
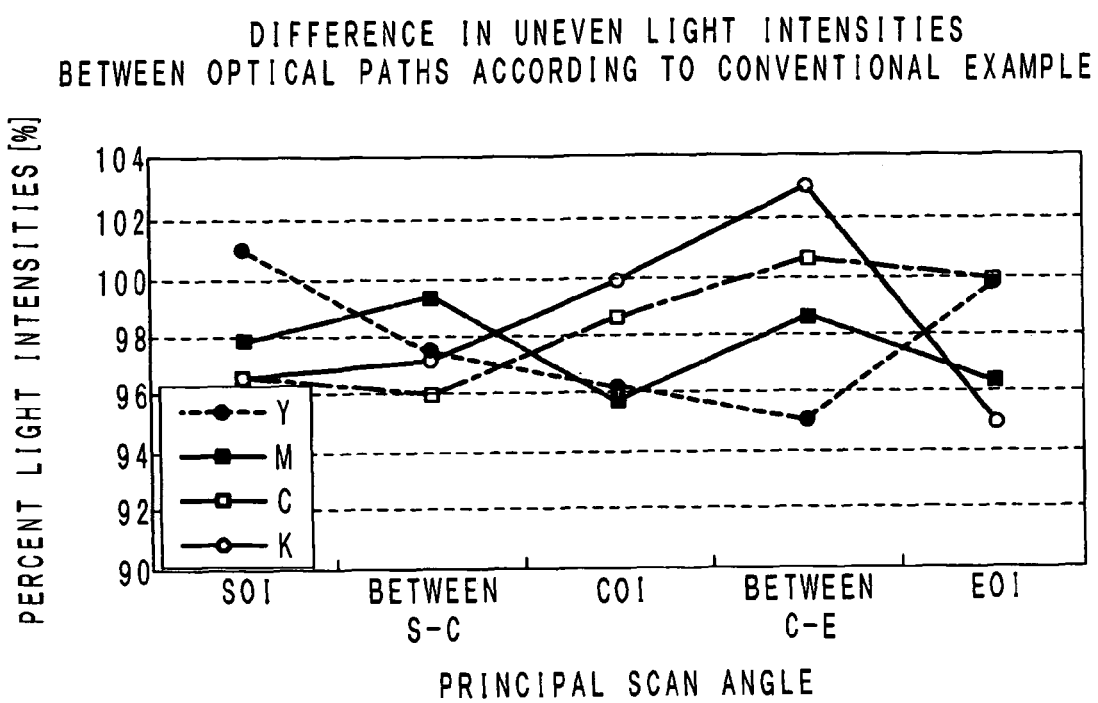
FIG. 10 is a graph showing uneven light intensities on scan surfaces for their respective colors in the conventional art.

In the case where the common scanning lenses and the individual scanning lenses are lenses formed of resin, birefringence occurs due to formation-related factors. The amount of birefringence is intended to mean substantially the same as retardation of birefringent light, and varies among positions in a lens, as shown in FIG. 6. Here, FIG. 6 shows contours (drawn within a frame of dotted lines) each connecting positions with the same amount of birefringence in the lens. When an optical beam passes through such a lens, the degree of change in the polarization state of the optical beam varies in accordance with the position through which the beam passes. In addition, the transmittance and the reflectance of lenses and mirrors in a laser scanning optical device depend on the polarization state of an incident optical beam, and therefore, if the polarization state changes differently in accordance with the position of incidence, the optical beam experiences uneven transmission and uneven reflection. Such uneven transmission and uneven reflection lead to uneven light intensities on the scan surfaces of the photoreceptor drums 40. Moreover, since uneven transmission and uneven reflection vary among colors, there is a difference in uneven light intensities between optical paths for their respective colors, as described with reference to FIG. 10.

In the present invention, to reduce the difference in uneven light intensities between optical paths, at least one pair of optical beams B is formed. In the present embodiment, by way of a preferred example, optical beams $B_y$ and $B_k$ are predetermined as a first pair, and optical beams $B_m$ and $B_c$ are determined as a second pair. For the first pair, two light sources $11_y$ and $11_k$ are arranged with their planes of polarization $Fs_a$ and $Fs_b$ symmetrical to each other with respect to horizontal plane $F_1$, for example, as shown in FIGS. 2 to 4. Moreover, optical beams $B_y$ and $B_k$ are incident on the polygon mirror at inclination angle $\theta p_1$, symmetrically with respect to horizontal plane $F_1$, as shown in FIG. 4. Thereafter, both optical beams $B_y$ and $B_k$ pass through the common scanning lenses 21 and 22 symmetrically shaped with respect to horizontal plane $F_1$. Subsequently, optical beams $B_y$ and $B_k$ pass through first and second individual scanning lenses $23_y$ and $23_k$ symmetrically arranged with respect to horizontal plane $F_1$.

In this manner, the common scanning lenses 21 and 22 have symmetrical shapes, and such symmetry is ensured between optical beams $B_y$ and $B_k$ as well. Accordingly, optical beams $B_y$ and $B_k$ incident on the common scanning lenses 21 and 22 experience substantially the same amount of birefringence for each principal scan angle, and consequently, optical beams $B_y$ and $B_k$ incident on the common scanning lenses 21 and 22 have substantially the same polarization state. In addition, first and second individual scanning lenses $23_y$ and $23_k$ are produced from the same mold, have the same shape within the same lot, and are arranged symmetrically in opposite orientations, so that optical beams $B_y$ and $B_k$ at the same principal scan angle experience substantially the same amount of birefringence. As a result, optical beams $B_y$ and $B_k$ incident on first and second individual scanning lenses $23_y$ and $23_k$ have substantially the same polarization state. Thus, the degree of polarization change can be aligned in the principal scanning direction and equalized between paired optical beams $B_y$ and $B_k$, so that uneven transmission and uneven reflection can be equalized between optical beams $B_y$ and $B_k$.

Figure 7:
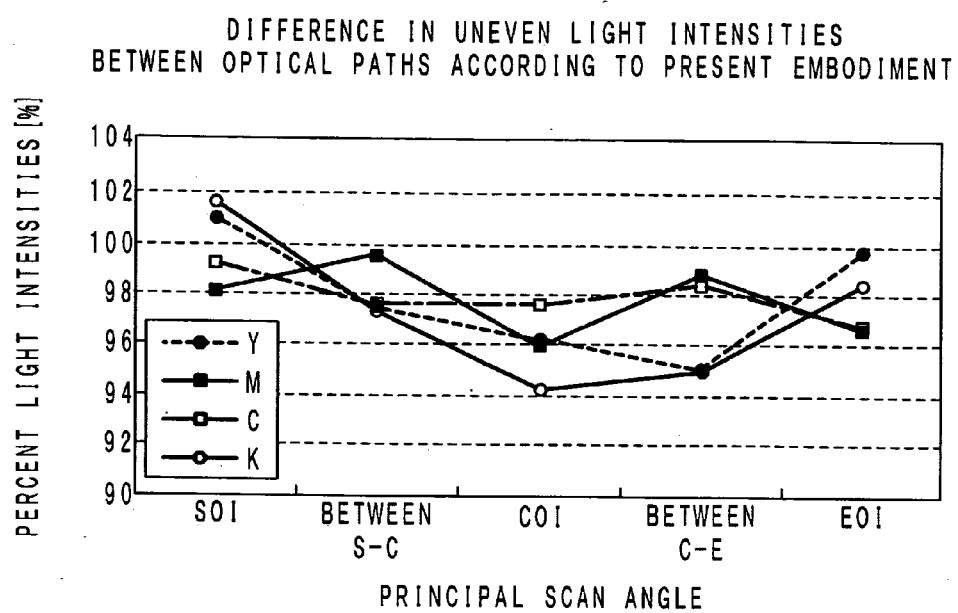
FIG. 7 is a graph showing uneven light intensities on scan surfaces for their respective colors in the present embodiment.

To put the above in other words, it is possible to decrease the difference in the uneven light intensities on the scan surfaces of photoreceptor drums $40_y$ and $40_k$ and the difference in uneven light intensities between the optical paths, as shown in FIG. 7. More concretely, for the conventional art in FIG. 10, looking in particular at the difference between the optical paths for Y and K, the difference between their percent light intensities is up to 8%, whereas for the present embodiment in FIG. 7, the difference between their percent light intensities is up to about 4%.

Note that in the foregoing, the pair of optical beams $B_y$ and $B_k$ has been described, but symmetry is similarly ensured for the second pair, and therefore the difference in uneven light intensities between optical beams $B_m$ and $B_c$ can be decreased.

Further, when a material with a high photoelastic coefficient (e.g., a photoelastic coefficient of $40 \times 10^{12}$ $PA^{-1}$ or more) is employed for the scanning lenses 21 to 23 from the viewpoint of cost, stress birefringent in the scanning lenses 21 to 23 increases, rendering light intensities more uneven on the scan surfaces. In the case where a laser scanning optical device with such scanning lenses 21 to 23 employs the configuration of the present embodiment, the difference in uneven light intensities between optical paths can be satisfactorily decreased.

Furthermore, the present embodiment has been described taking as an example a so-called one-side deflection laser scanning optical device. Note that in the case of one-side deflection, all optical beams B are polarized on one side of the polygon mirror. In such one-side deflection, all of the optical beams B are incident on the common scanning lenses 21 and 22, and therefore optical beams $B_y$ and $B_k$ further from horizontal plane $F_1$ in the Z-axis direction have larger amounts of birefringence. However, in the configuration of the present embodiment, optical beams $B_y$ and $B_k$ are incident on the common scanning lenses 21 and 22 at positions such that the beams experience substantially the same amount of birefringent, making it possible to more effectively decrease the difference in uneven light intensities between optical paths.

Further still, the mirrors 24, 25, and 26 are preferably subjected to so-called multi-coating, i.e., a plurality of layers (e.g., five layers) of optical thin film are applied to a metal film. For example, the first layer has a refractive index of 1.38 and a film thickness of 0.25 wavelength, the second layer has a refractive index of 2.35 and a film thickness of 0.25 wavelength, the third layer has a refractive index of 1.38 and a film thickness of 0.25 wavelength, the fourth layer has a refractive index of 2.35 and a film thickness of 0.25 wavelength, and the fifth layer has a refractive index of 1.46 and a film thickness of 0.5 wavelength. The reasons for multi-coating are as follows. Unlike lenses, the number of mirrors might vary between optical paths for convenience of arrangement of the optical paths. In the present embodiment, while two mirrors $24_y$ and $25_y$ are disposed in the optical path for optical beam $B_y$, three mirrors $24_m$, $25_m$, and $26_m$ are disposed in the optical path for optical beam $B_m$. In such a case, the difference in the number of mirrors results in a difference in uneven light intensities between the optical paths. In the present embodiment, to reduce such a difference in uneven light intensities, the mirrors 24 to 26 are multi-coated. This diminishes the contribution of the mirrors to uneven light intensities, making it possible to more effectively reduce the difference in uneven light intensities between optical paths.

First and second individual scanning lenses $23_y$ and $23_k$ are preferably shaped so as to be symmetrical to each other in the Y-axis direction (principal scanning direction) with respect to a plane defined by the direction of the optical axis A1 (see FIG. 5) of each lens and the Z-axis direction (secondary direction). Therefore, when either first or second individual scanning lens $23_y$ or $23_k$ is rotated 180°, that lens has the same shape as the other lens. Accordingly, the same lenses can be used as first and second individual scanning lenses $23_y$ and $23_k$. Third and fourth individual scanning lenses $23_m$ and $23_c$ can be the same lenses as well. Thus, it is possible to reduce the difference in uneven light intensities between optical paths while achieving cost reduction of the laser scanning optical device.

Modification to Laser Scanning Optical Device

Figure 8:
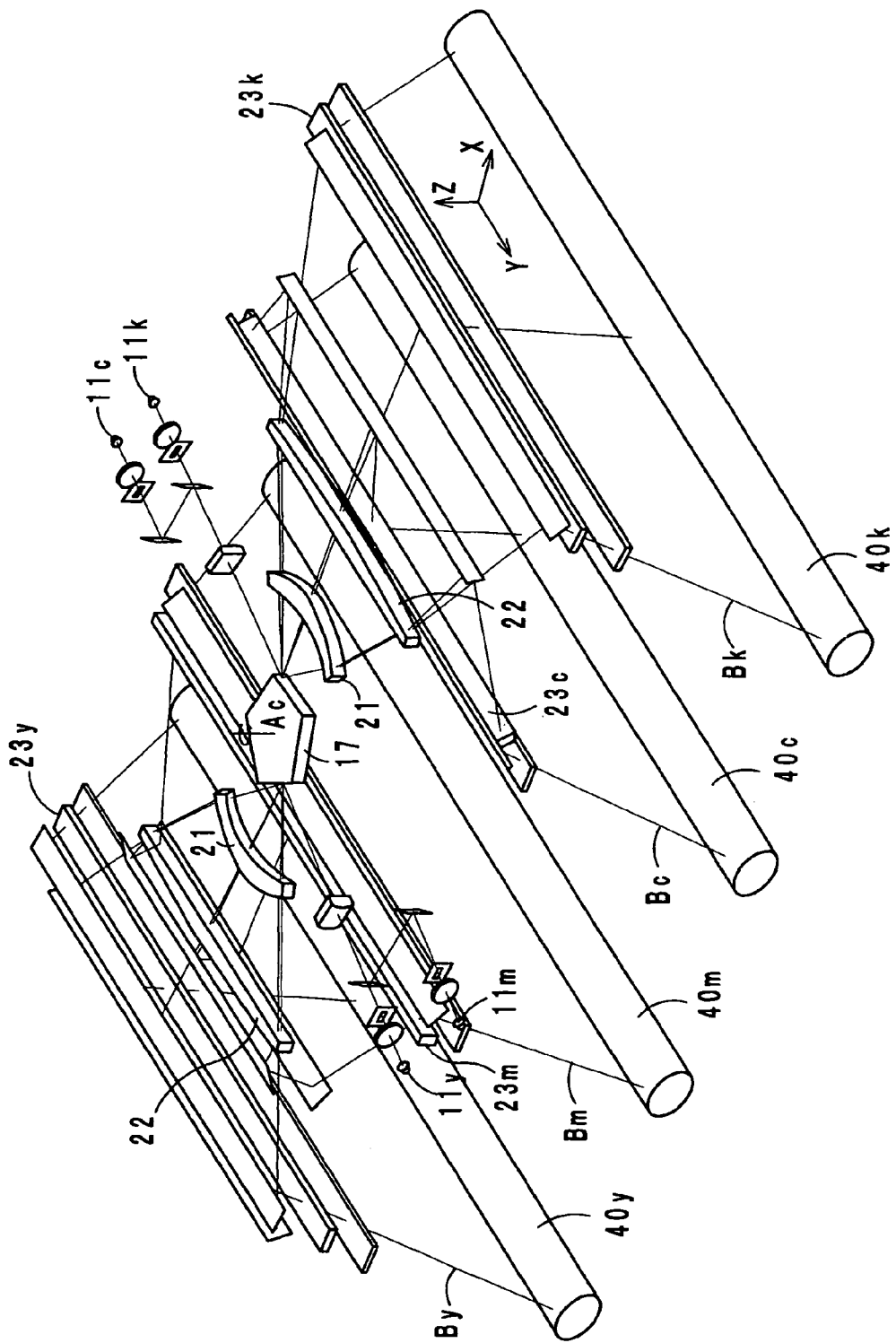
FIG. 8 is an external perspective view of a laser scanning optical device according to a modification.

The above embodiment has been described with respect to a laser scanning optical device employing so-called one-side deflection. This is not restrictive, and the configuration of the present embodiment can be applied to a laser scanning optical device employing double-side deflection as shown in FIG. 8. In FIG. 8, only the principal parts of the present invention are denoted by reference characters. Moreover, in FIG. 8, elements corresponding to those in FIG. 1 are denoted by the same reference characters, and any descriptions thereof will be omitted.

Figure 9:
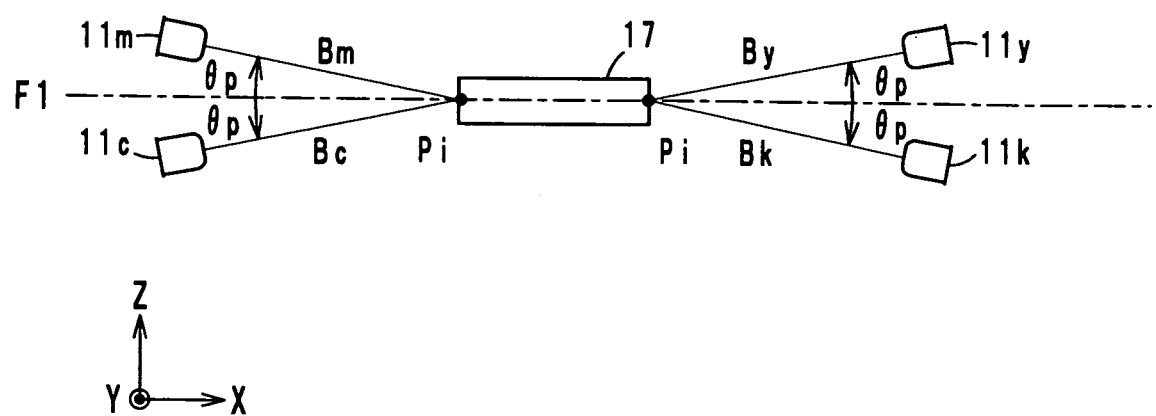
FIG. 9 is a schematic diagram showing inclination angles of optical beams in the laser scanning optical device in FIG. 8.

In FIG. 8, optical beams B ($B_y$, $B_m$, $B_c$, and $B_k$) from four light sources 11 ($11_y$, $11_m$, $11_c$, and $11_k$) are incident on a polygon mirror of a deflector 17 via cylindrical lenses, etc. Concretely, a pair of optical beams $B_y$ and $B_m$ and a pair of optical beams $B_c$ and $B_k$ are incident on their respective different surfaces of the polygon mirror. Here, optical beams $B_y$ and $B_m$ incident on the same reflective surface are obliquely incident at the same angle $\theta_p$ (e.g., 1.37°) with respect to horizontal plane $F_1$ described in the above embodiment, as shown in FIG. 9, and the same applies to optical beams $B_c$ and $B_k$ incident on the same reflective surface as each other.

Furthermore, there are arranged common scanning lenses 21 and 22 for causing optical beams $B_y$ and $B_m$ deflected in the principal scanning direction Y by the deflector 17 to form images on photoreceptor drums $40_y$ and $40_m$, respectively, a plurality of mirrors for guiding the fluxes transmitted through the lenses 21 and 22 onto photoreceptor drums $40_y$ and $40_m$, and individual scanning lenses $23_y$ and $23_m$ separately arranged in their respective optical paths. Similarly, there are arranged common scanning lenses 21 and 22 for causing optical beams $B_c$ and $B_k$ deflected in the principal scanning direction Y by the deflector 17 to form images on photoreceptor drums $40_c$ and $40_k$, respectively, a plurality of mirrors for guiding the fluxes transmitted through the lenses 21 and 22 onto photoreceptor drums $40_c$ and $40_k$, and individual scanning lenses $23_c$ and $23_k$ separately arranged in their respective optical paths.

By way of example, the common scanning lenses 21 and 22 in the present modification have specifications shown in Table 5 below. Note that surface numbers 1 and 2 are the entrance surface and the exit surface on the common scanning lens 21 for optical beams B, and surface numbers 3 and 4 are the entrance surface and the exit surface on the common scanning lens 22.

TABLE 5

CONFIGURATION OF COMMON SCANNING LENS

| | SURFACE NUMBER | SHAPE OF SURFACE | CORDINATE OF VERTEX X | Y | Z | REFRACTIVE INDEX |
|---|---|---|---|---|---|---|
| fθ1 | 1 | FREE-FORM SURFACE | 35.000 | 0.000 | 0.000 | 1.504 |
| | 2 | FREE-FORM SURFACE | 48.300 | 0.000 | 0.000 | |
| fθ2 | 3 | FREE-FORM SURFACE | 57.500 | 0.000 | 0.000 | 1.000 |
| | 4 | FREE-FORM SURFACE | 64.000 | 0.000 | 0.000 | 1.572 |

Free-form surface coefficients for surface numbers 1 to 4 in Table 5 are shown in Table 6 below.

TABLE 6

FREE-FORM SURFACE COEFFICIENT OF SCANNING LENS

| | FREE-FORM SURFACE | | | Z 0 | 1 | 2 |
|---|---|---|---|---|---|---|
| SURFACE NUMBER 1 | Y | 0 | | 0.0000E+00 | 0 | −0.022 |
| | | 1 | | 4.6158E−04 | 0 | −4.83502E−06 |
| | | 2 | | −4.7538E−03 | 0 | 4.14353E−06 |
| | | 3 | | −4.2919E−07 | 0 | −3.15773E−08 |
| | | 4 | | −2.2167E−07 | 0 | −4.09327E−09 |
| | | 6 | | −5.3124E−12 | 0 | 3.53491E−11 |
| | | 6 | | −3.7303E−11 | 0 | 4.21623E−12 |
| | | 7 | | 1.5828E−13 | 0 | −3.52812E−14 |
| | | 8 | | 8.3493E−15 | 0 | −2.68831E−15 |
| | | 9 | | −7.3561E−17 | 0 | 1.78882E−17 |
| | | 10 | | −1.0124E−18 | 0 | 6.63513E−19 |

| | FREE-FORM SURFACE | | Z 0 | | FREE-FORM SURFACE | | Z 0 |
|---|---|---|---|---|---|---|---|
| SURFACE NUMBER 2 | Y | 0 | 0.0000E+00 | SURFACE NUMBER 3 | Y | 0 | 0.0000E+00 |
| | | 1 | 0.0000E+00 | | | 1 | 0.0000E+00 |
| | | 2 | −9.0790E−03 | | | 2 | −9.0790E−03 |
| | | 3 | 0.0000E+00 | | | 3 | 0.0000E+00 |
| | | 4 | −5.7718E−07 | | | 4 | −5.7718E−07 |
| | | 5 | 0.0000E+00 | | | 5 | 0.0000E+00 |
| | | 6 | −5.6053E−11 | | | 6 | −5.6053E−11 |
| | | 7 | 0.0000E+00 | | | 7 | 0.0000E+00 |
| | | 8 | −3.4288E−14 | | | 8 | −3.4288E−14 |
| | | 9 | 0.0000E+00 | | | 9 | 0.0000E+00 |
| | | 10 | −3.3633E−18 | | | 10 | −3.3633E−18 |

| | FREE-FORM SURFACE | | | Z 0 | 1 | 2 |
|---|---|---|---|---|---|---|
| SURFACE NUMBER 4 | Y | 0 | | 0.0000E+00 | 0 | −0.01815664 |
| | | 1 | | 1.4519E−04 | 0 | −3.94089E−06 |
| | | 2 | | −2.3317E−03 | 0 | 1.08093E−06 |
| | | 3 | | 1.9233E−07 | 0 | 7.01634E−10 |
| | | 4 | | −1.8939E−07 | 0 | −3.11537E−10 |
| | | 5 | | −3.4329E−10 | 0 | −6.51336E−13 |
| | | 6 | | 1.1768E−11 | 0 | 1.57081E−13 |
| | | 7 | | 1.1313E−13 | 0 | 1.11722E−16 |
| | | 8 | | −2.5920E−15 | 0 | −6.2292E−17 |
| | | 9 | | −1.3141E−17 | 0 | 2.38537E−20 |
| | | 10 | | 2.7680E−19 | 0 | 1.0229E−20 |

TABLE 6-continued

| | FREE-FORM SURFACE COEFFICIENT OF SCANNING LENS | | | | | |
|---|---|---|---|---|---|---|
| | FREE-FORM SURFACE | | Z | | | |
| | | | 3 | 4 | 5 | 6 |
| SURFACE NUMBER 4 | Y | 0 | 0.0000E+00 | −2.1139E−05 | 0.0000E+00 | 6.0763E−07 |
| | | 1 | 0.0000E+00 | 4.5936E−07 | 0.0000E+00 | −9.8681E−09 |
| | | 2 | 0.0000E+00 | 7.5044E−08 | 0.0000E+00 | −2.5762E−09 |
| | | 3 | 0.0000E+00 | −5.6687E−10 | 0.0000E+00 | 1.3896E−11 |
| | | 4 | 0.0000E+00 | −6.1750E−11 | 0.0000E+00 | 2.4384E−12 |
| | | 5 | 0.0000E+00 | 2.9862E−13 | 0.0000E+00 | −7.4792E−15 |
| | | 6 | 0.0000E+00 | 1.9094E−14 | 0.0000E+00 | −8.8561E−16 |
| | | 7 | 0.0000E+00 | −8.0322E−17 | 0.0000E+00 | 1.9289E−18 |
| | | 8 | 0.0000E+00 | −1.5286E−18 | 0.0000E+00 | 8.8849E−20 |
| | | 9 | 0.0000E+00 | 8.1937E−21 | 0.0000E+00 | −1.6381E−22 |
| | | 10 | 0.0000E+00 | −3.1918E−22 | 0.0000E+00 | 1.1662E−23 |

In the present modification, each individual scanning lens 23 may have the same specifications, which are shown in Table 7 below. Here, in Table 7, surface numbers 5, 6, and 7 refer to the entrance surface, the exit surface, and the imaging surface on the individual scanning lens 23.

TABLE 7

| | CONFIGURATION OF INDIVIDUAL SCANNING LENS | | | | | |
|---|---|---|---|---|---|---|
| | SURFACE NUMBER | SHAPE OF SURFACE | CORDINATE OF VERTEX | | | REFRACTIVE INDEX |
| | | | X | Y | Z | |
| BEYOND fθ 3 | 5 | FREE-FORM SURFACE | 156.000 | 0.000 | −3.731 | 1.572 |
| | 6 | FLAT SURFACE | 160.000 | 0.000 | −3.731 | |
| IMAGING SURFACE | 7 | FLAT SURFACE | 261.780 | 0.000 | −1.150 | 1.000 |

Free-form surface coefficients for surface numbers 5 to 7 in Table 7 are shown in Table 8 below.

TABLE 8

| | FREE-FORM SURFACE COEFFICIENT OF SCANNING LENS | | | | |
|---|---|---|---|---|---|
| | FREE-FORM SURFACE | | Z | | |
| | | | 0 | 1 | 2 |
| SURFACE NUMBER 5 | Y | 0 | 0.0000E+00 | −5.2597E−02 | 1.0188E−02 |
| | | 1 | 0.0000E+00 | 0.0000E+00 | 0.0000E+00 |
| | | 2 | −7.4875E−04 | 1.8975E−06 | −2.8315E−07 |
| | | 3 | 0.0000E+00 | 0.0000E+00 | 0.0000E+00 |
| | | 4 | 1.1447E−07 | 2.8952E−12 | −6.4684E−12 |
| | | 5 | 0.0000E+00 | 0.0000E+00 | 0.0000E+00 |
| | | 6 | −7.7156E−12 | −8.8919E−15 | 1.8261E−15 |
| | | 7 | 0.0000E+00 | 0.0000E+00 | 0.0000E+00 |
| | | 8 | 3.4676E−16 | 6.3096E−19 | −1.1405E−19 |
| | | 9 | 0.0000E+00 | 0.0000E+00 | 0.0000E+00 |
| | | 10 | −6.1247E−21 | −1.5624E−23 | 2.5197E−24 |

Although the present invention has been described in connection with the preferred embodiment above, it is to be noted that various changes and modifications are possible to those who are skilled in the art. Such changes and modifications are to be understood as being within the scope of the invention.

What is claimed is:

1. A laser scanning optical device that scans optical beams in a principal scanning direction on scan surfaces of photoreceptors provided for their respective colors, the device comprising:

a plurality of light sources configured to emit optical beams from a plurality of emission points;

a deflection section configured to, upon incidence of optical beams from the light sources, deflect the incident optical beams by a polygon mirror; and a scanning optical system configured to cause the optical beams deflected by the deflection section to form images on the scan surfaces for the respective colors, wherein, among the optical beams emitted by the light sources, a predetermined pair of optical beams are incident on the polygon mirror at the same inclination angle, symmetrically with respect to a horizontal plane perpendicular to a central axis of the polygon mirror and passing through a center of the polygon mirror in a secondary direction, the scanning optical system includes:
a common scanning lens that is optically anisotropic and on which a pair of optical beams polarized by the polygon mirror are incident; and
first and second individual scanning lenses that are optically anisotropic and on which the one and the other of the pair of optical beams are respectively incident after the pair is transmitted through the common scanning lens,
the light sources that emit the pair of optical beams are arranged such that their respective planes of polarization are symmetrical to each other with respect to the horizontal plane, the planes of polarization being planes each including the emission points and having angles other than 0° and 90° with respect to the horizontal plane,
the first and second individual scanning lenses are arranged so as to be symmetrical to each other with respect to the horizontal plane,
the common scanning lens has a symmetrical shape in the secondary direction with respect to a plane including its own optical axis and being parallel to the horizontal plane, and
each of the individual scanning lenses has an asymmetrical shape in the secondary direction with respect to a plane including its own optical axis and being parallel to the horizontal plane.

2. The laser scanning optical device according to claim 1, wherein the first and second individual scanning lenses are resin molded products of the same shape obtained from the same mold.

3. The laser scanning optical device according to claim 1, wherein each of the individual scanning lenses has a symmetrical shape in the principal scanning direction with respect to a plane defined by its own optical axis direction and the secondary direction.

4. The laser scanning optical device according to claim 1, wherein the common scanning lens and the first and second individual scanning lenses are made of a material with a photoelastic coefficient of $40 \times 10^{-12}$ $PA^{-1}$ or more.

5. The laser scanning optical device according to claim 1, wherein,
the number of light sources is four,
among the optical beams emitted by the four light sources, optical beams included in a first pair are incident on the polygon mirror at the same inclination angle $\theta p_1$, symmetrically with respect to the horizontal plane,
among the optical beams emitted by the four light sources, optical beams included in a second pair are incident on the polygon mirror at the same inclination angle $\theta p_2$, symmetrically with respect to the horizontal plane, and
the optical beams included in the first and second pairs are incident on the common scanning lens.

6. The laser scanning optical device according to claim 1, wherein,
the scanning optical system further includes a plurality of reflecting sections that cause optical beams deflected by the deflection section to form images on the scan surfaces for their respective colors, and
the reflecting sections are multi-coated.

* * * * *